(12) United States Patent
Bassine

(10) Patent No.: US 6,371,745 B1
(45) Date of Patent: Apr. 16, 2002

(54) PIVOTING VANE ROTARY COMPRESSOR

(76) Inventor: Stuart Bassine, 917-919 SE. 15th Ave., Cape Coral, FL (US) 33990

( * ) Notice: Subject to any disclaimer, the term of this patent is extended or adjusted under 35 U.S.C. 154(b) by 0 days.

(21) Appl. No.: 09/595,493

(22) Filed: Jun. 16, 2000

(51) Int. Cl.⁷ .................................................. F03C 4/00
(52) U.S. Cl. ...................................... 418/268; 418/239
(58) Field of Search ................................ 418/268, 239

(56) References Cited

U.S. PATENT DOCUMENTS

| | | | | |
|---|---|---|---|---|
| 156,814 A | * | 11/1874 | Peck | 418/268 |
| 236,732 A | * | 1/1881 | Sutton | 418/268 |
| 726,907 A | * | 5/1903 | Gulich | 418/239 |
| 4,415,322 A | * | 11/1983 | Baudin | 418/260 |
| 4,451,215 A | * | 5/1984 | Winkler et al. | 418/260 |
| 4,762,480 A | * | 8/1988 | Winkler et al. | 418/270 |
| 4,772,185 A | * | 9/1988 | Hertell | 418/3 |
| 5,188,524 A | * | 2/1993 | Bassine | 418/268 |

FOREIGN PATENT DOCUMENTS

| | | | | |
|---|---|---|---|---|
| DE | 3423276 A | * | 1/1986 | 418/268 |
| FR | 998602 A | * | 1/1952 | 418/268 |
| GB | 2074246 A | * | 5/1984 | 418/260 |
| GB | 2169965 A | * | 7/1986 | 418/268 |
| JP | 58-204992 A | * | 11/1983 | 418/268 |

* cited by examiner

*Primary Examiner*—Thomas Denion
*Assistant Examiner*—Theresa Trieu
(74) *Attorney, Agent, or Firm*—William E. Noonan

(57) ABSTRACT

A rotary compressor includes a housing having a generally cylindrical chamber and rotor mounted eccentrically within the chamber to define about the rotor a main chamber region, which narrows to a constricted region. There is an intake port formed in the housing for introducing air into the main chamber region and an exhaust port for discharging air from the constricted chamber region. At least pair of curved vanes are pivotably attached to the rotor and extend in generally opposite arcuate directions from the rotor into the chamber. The rotor is driven in a single direction such that the vanes are urged against the walls of chamber to define at least one compartment that transmits air from the main chamber region to the constricted chamber region. This compresses the air, which is discharged through the exhaust port. The circumferential surface of the rotor and each vane have substantially conforming curvatures such that the vane is driven into flush interengagement with the rotor as the vane is driven through the constricted chamber region by the rotor. This substantially decreases the size of an associated compartment and increases the air compression therein.

8 Claims, 4 Drawing Sheets

PIVOTING VANE ROTARY COMPRESSOR

FIELD OF THE INVENTION

This invention relates to a pivoting vane design for a rotary compressor and in particular to a pivoting vane for a rotary compressor of the type used in oxygen concentrators and other analogous applications.

BACKGROUND OF THE INVENTION

Conventional oxygen concentrators often employ a rotary compressor to pump air through the concentrator and to the patient. Such compressors provide a desirably high rate of air flow and do not generate excessive pressures. The typical rotary compressor features carbon vanes that are slidably mounted in generally radial slots in the compressor's rotor. The rotor itself is eccentrically mounted in a chamber formed in the housing of the compressor. An electric motor drives the rotor such that centrifugal force urges the carbon vanes outwardly from their slots to engage the wall of the chamber. The vanes form successive compartments that collect air that is introduced into the compressor. As the vanes rotate, the air is moved into a gradually constricted portion of the chamber where it is compressed. This compressed air is then delivered through an exhaust port to the concentrator's filter.

Conventional carbon vane rotary compressors exhibit at least a couple of significant problems. As each vane slides back and forth within its respective slot, a considerable amount of heat is generated. Moreover, the friction resulting from such sliding causes the vanes to wear and generates carbon dust, which can foul the compressor. As a result, these types of compressors required frequent maintenance. In particular, the dust must be removed an the vanes replaced at regular intervals. Moreover, due to the constant wear on the vanes, known rotary compressors are very likely to exhibit gaps between the ends or tips of the vanes and the chamber wall. This can result in air leakage, which may significantly impair the operation of the compressor and the oxygen concentrator.

Compressors have been provided to overcome the foregoing difficulties. See my U.S. Pat. No. 5,188,524. That device employs a pivoting vane rotary compressor wherein pairs of opposing vanes mounted to a rotor define pockets or compartments. As the vane rotate, the respective compartments are gradually constricted to compress the air or oxygen being transmitted by the machine. Although this product works quite well, I have determined that it is desirable to further reduce the space of the compartments so that improved compression and efficiency are achieved.

SUMMARY OF THE INVENTION

It is therefore an object of this invention to provide an improved pivoting vane rotary compressor that achieves significantly improved compression and efficiency.

It is a further object of this invention to provide a pivoting vane rotary compressor that is much more durable and effective and is far less likely to exhibit maintenance problems than conventional sliding carbon vane compressors.

This invention features a rotary compressor including a housing having a generally cylindrical chamber. There is a rotor mounted eccentrically in the chamber to define about the rotor a main chamber region, which narrows to a constricted chamber region. The rotor includes a circumferential surface. An intake port is formed in the housing for introducing air into the main chamber region. An exhaust port is formed in the housing for discharging air from the constricted chamber region. There is at least one pair of curved vanes pivotably and circumferentially attached to the rotor and extending in generally opposite arcuate directions from the rotor into the chamber. There are means for rotatably driving the rotor in a single direction such that the pair of vanes are urged against the wall of the chamber to define a compartment that transmits air from the main chamber region to the constricted chamber region. This transmitted air is compressed and discharged to the exhaust port. Each vane has a curvature that substantially conforms to the circumferential curvature of the rotor. As a result, each vane is urged into substantially flush interengagement with the circumferential surface of the rotor when the vane is driven by the rotor into the constricted chamber region. This shrinks the volume of the compartments within the constricted region to increase the air compression therein.

In a preferred embodiment, each pivoting vane includes an arcuate portion and an enlarged or thickened distal end portion. The rotor may include at least a pair of circumferential recesses. Each such pair of recesses receives a corresponding pair of pivoting vanes when that pair of vanes is driven by the rotor into the constricted chamber region. This further reduces the size of the compartment defined by the pair of vanes and increases the air pressure within that compartment. The recesses may be positioned on the rotor to receive the enlarged distal end portions of the pivoting vanes. Typically, each recess is associated with and receives a first pivoting vane from one pair of vanes and a second, oppositely extending pivoting vane from a second, adjacent pair of vanes. In other words, each recess accommodates one pivoting vane from each of two adjacent pairs of vanes. At least one adjoining pair of vanes may extend convergently relative to one another and at least one pair may extend divergently relative to one another.

In alternative embodiments, the entire pivoting vane may fit in a respective recess. In still other versions, recesses may be omitted and the vanes may flushly interengage the outer surface of the rotor.

DETAILED DESCRIPTION OF PREFERRED EMBODIMENTS

Other objects, features and advantages will occur from the following description of a preferred embodiment and the accompanying drawings, in which.

Figure 1:
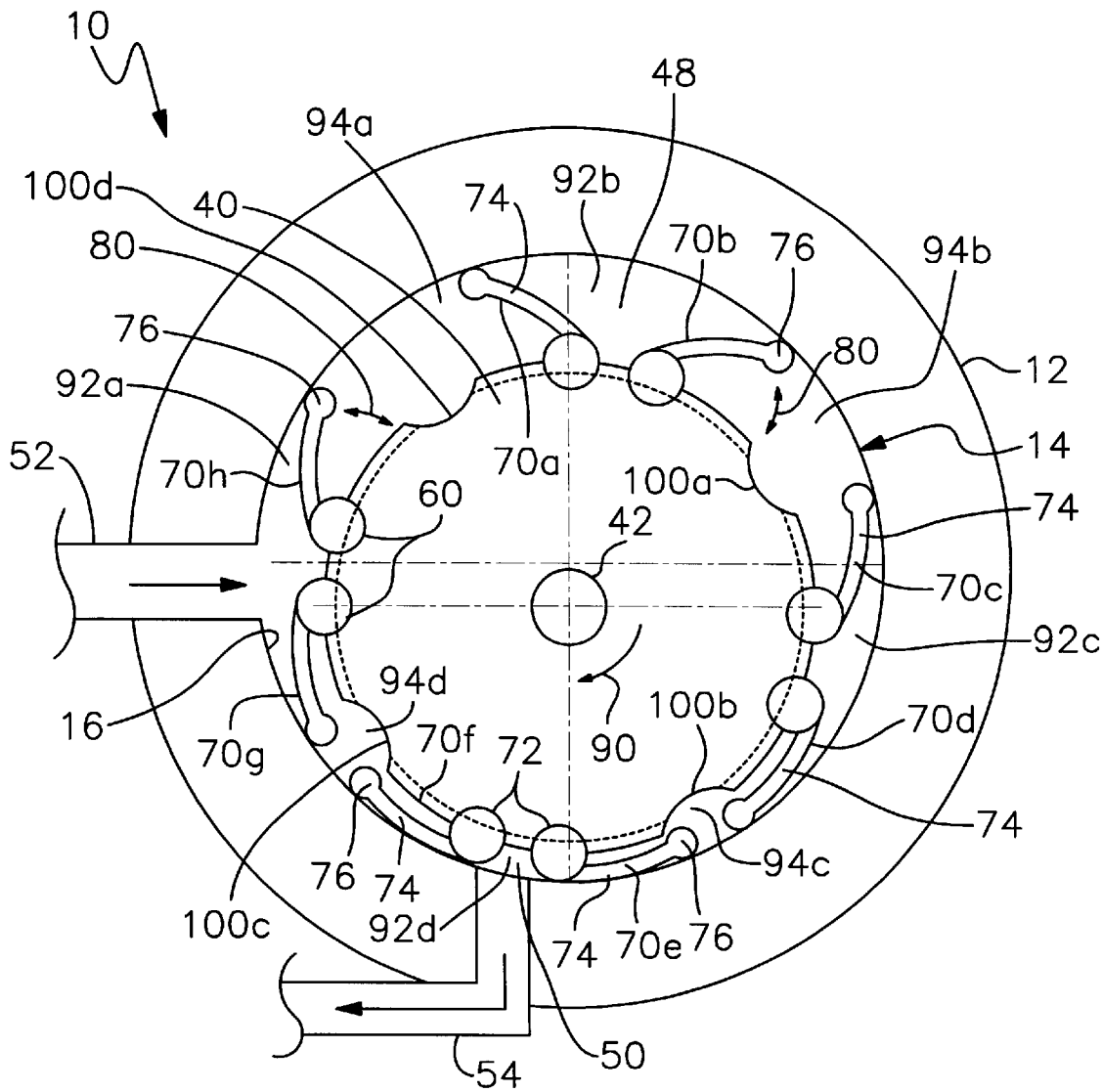
FIG. 1 is an elevational, partly schematic view of a preferred embodiment of the compressor of this invention.

There is shown in FIG. 1 a pivoting vane compressor 10 including a housing 12 that features a generally cylindrical inner chamber 14. The chamber is defined by a cylindrical inner wall 16 composed of Teflon (™) or a similar low friction material.

Figure 2:
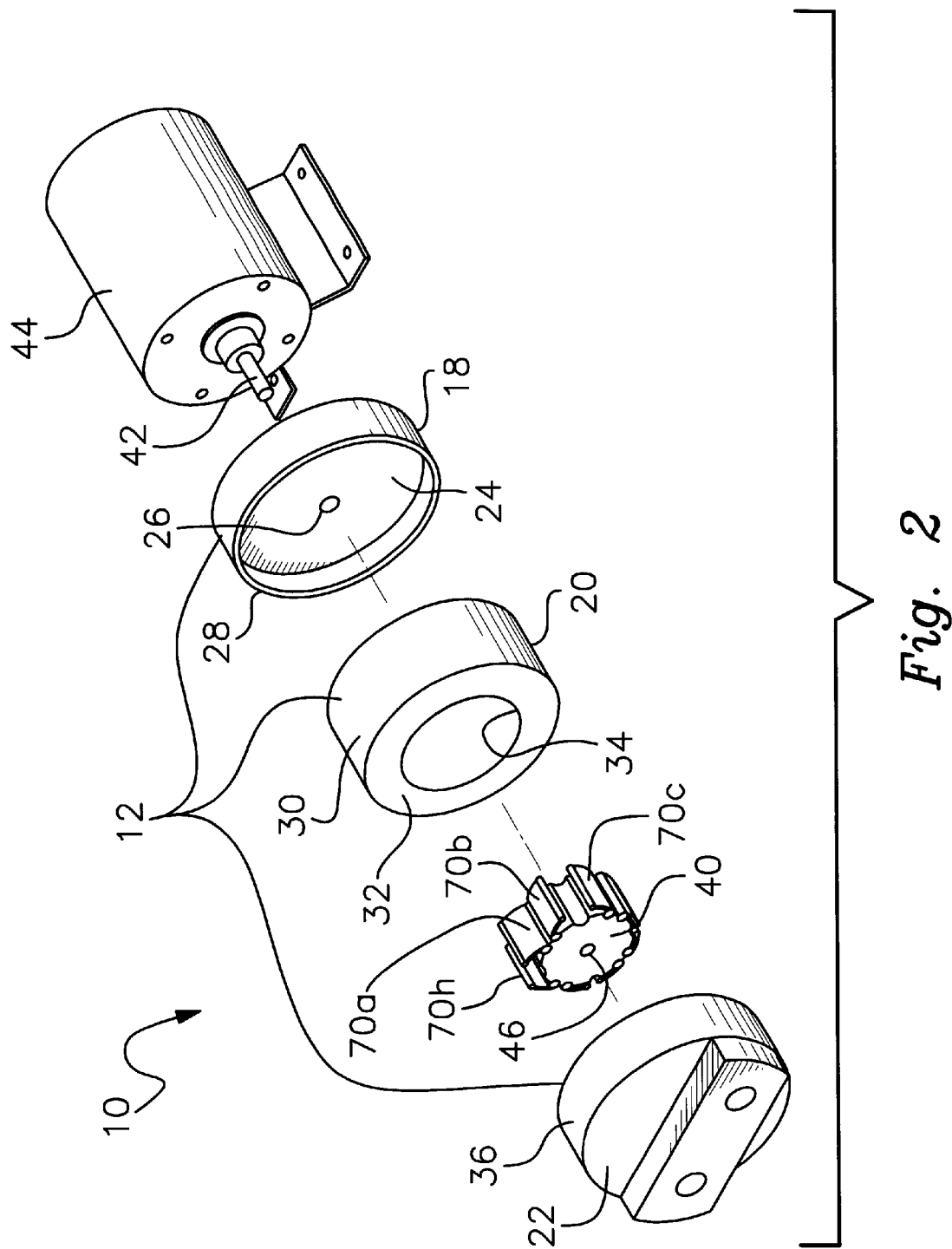
FIG. 2 is an exploded view of the compressor.

Compressor 10 is depicted in exploded form in FIG. 2. As shown therein, housing 12 is defined by a casing portion 18, an annular portion 20 and a cover 22. Casing portion 18 features a circular side plate 24 having a central opening 26. A annular wall 28 extends upwardly from plate 24. Annular member 20 fits within wall 28 of base 18. Annular portion 20 particularly includes a circumferential portion 30 and an annular side wall 32 connected thereto. A central opening 34 is formed in wall 32. Central opening 34 is generally axially aligned with smaller central opening 26 in casing 18. Cover 22 features a circumferential rim 36 that fits over circumferential wall 30 of annular portion 20. The components of housing 12 are interconnected by conventional means that will be known to those persons skilled in the compressor art.

A rotor 40, FIGS. 1 and 2, is mounted eccentrically within chamber 14. More particularly, rotor 40 is mounted fixedly to rotating central shaft 42. As best shown in FIG. 2, central shaft 42 comprises the operational drive shaft of a motor 44. Shaft 42 extends through central opening 26 in housing casing 18 and is engaged with rotor 40 through a central opening 46 in the rotor. When the motor 44 is operated, shaft 42 turns rotor 40 within chamber 14 of housing 12.

Because rotor 40 is mounted eccentrically within chamber 14, the rotor is surrounded by a main chamber region 48, FIG. 1, that gradually narrows to a constricted chamber region 50. A standard intake port 52 and a standard exhaust port 54 operably communicate with chamber 14. More particularly, constricted chamber region 50 is proximate to and communicates with exhaust port 54. The main chamber region 48 extends between constricted region 50 and intake port 52. The intake port is communicably interconnected with a conventional air inlet line and exhaust port 54 is similarly interconnected with a conventional air exhaust line.

Rotor 40 includes eight or some other plurality (e.g. 6, 10 or more) of axially longitudinal channels 60 formed about its circumferential surface. Each channel has a generally circular cross-sectional shape and an entrance that is formed in the circumferential surface of the rotor. The interior of each channel includes a diameter that is larger than the entrance to the channel. This permits respective vane elements to be pivotably mounted within the channels as is described more fully below. The channels 60 are typically spaced evenly apart about rotor 40, although in alternative embodiments uneven spacing arrangements may be utilized.

As shown in FIGS. 1 and 2, a plurality of vane elements 70a–h, which are composed of a wear and heat resistant material such as Teflon (™), are pivotally received respectively in the rotor channels 60. The vanes may comprise Teflon (™) ceramic, a Teflon (™) coated metal or other substance. Each vane element includes a generally cylindrical pin or pivot shaft 72 that is axially aligned with and received by a respective rotor channel 60. See, for example recess 100a disposed between a first adjoining pair of vanes 70a, 70b and a second pair of vanes 70c, 70d. Each vane element also includes an elongate curved or arcuate portion 74 that extends integrally from shaft 72. The distal end of each arcuate portion 74 carries an enlarged or relatively thick portion 76. In other versions, the distal ends or tips of the vanes may be even thicker than what is depicted.

Each vane element 70a–h is mounted to rotor 40 by inserting its shaft 72 into respective one of the longitudinal rotor channels 60. Shaft 72 may be inserted into the channel, for example, by removing cover 22, FIG. 1. The shaft is then slid into its respective channel in the rotor. When inserted in this manner, each vane has a width generally equal to the width or thickness of rotor 40. Typically, shaft 72 has a diameter that is somewhat larger than the entrance of its associated rotor channel 60. As a result, the vane element is secured generally radially to the circumferential surface of the rotor. At the same time, shaft 72 is pivotable within that channel. Each vane is permitted to pivot or rock relative to rotor 40, as indicated by doubled headed arrow 80 in FIG. 1. The vanes are arranged in closely adjoining pairs. The arcuate portions 74 closely of adjoining vanes 70a and b, 70c and d, 70e and f, and 70g and h extend divergently (i.e. in generally opposite directions) from the circumferential surface of rotor 40. An axially aligned circumferential recess 100a–d is formed in rotor 40 between each closely adjoining pair of vanes. One vane from each pair extends partially across each recess 100a–d in a arcuately converging fashion. See for example, vanes 70f and 70g extending partially and convergently across recess 100e. Each arcuately converging pair of vanes thereby forms a distally adjoining pair of vanes disposed on respective sides of an intermediate recess 100a–d.

In operation, shaft 42 and rotor 40 are rotatably driven in the direction of arrow 90, FIG. 1, by motor 44, FIG. 2. As a result, the pivoting vanes 70 rock or pivot outwardly and are urged by centrifugal force such that their outer enlarged tips 76 engaged the inner wall 16 of chamber 14. Each closely adjoining, diverging pair of vanes 70 thereby define a respective compartment 92a, 92b, 92c and 92d. Differently shaped compartments 94a, 94b, 94c and 94d are formed between respective distally adjoining pairs of vane elements (70b,c; 70d,e; 70f,g and 70h,a) that are curved or converge toward one another. More particularly, each compartment is defined by the closely or distally adjoining pair of vane elements 70a–h, the circumferential surface of rotor 40 and the inner circumferential chamber wall 16.

Air is introduced through air intake port 52 into chamber 14 via the compartments 92a–92d and 94a–94d, as those compartments successively pass adjacent to port 52. For example, in FIG. 1, compartment 92a is shown passing the intake port. As a result, the air is introduced through port 52 into compartment 92a and this air is transmitted by the rotating vanes through main chamber region 48 and toward constricted chamber region 50. This causes the air in compartment 92a to be compressed by the gradually narrowing chamber. Eventually, the compressed air is delivered and discharged through exhaust port 54 at a desired pressure. From there, the compressed air is delivered through an appropriate line, for example, to the filter beds of an oxygen concentrator or other apparatus. As each of the other compartments successively passes intake port 52, that compartment likewise transmits air to the constricted region 50 so that such air is compressed and discharged through exhaust port 54.

Each arcuate or curved portion 74 has a shape that generally conforms to a corresponding portion of the circumferential surface of rotor 40. As a result, when each vane element passes through constricted region 50, the arcuate portion of the vane is urged substantially flush against the circumferential surface of the rotor.

Each recess 100a–d is positioned on the circumference of rotor 40 such that the recess receives at least a portion of two distally adjoining vane elements 70a–h when those vane elements are urged against the circumferential surface of the rotor. In the version shown in FIG. 1, each recess 100a–d is capable of receiving the distal enlarged edge 76 from each of the two adjacent vane elements disposed on respective sides of the recess. For example, recess 100b receives respective tips 76 of vanes 70d and 70e. The recesses 100a–d are positioned such that a distally adjoining pair of vane elements are engagable with a corresponding recess 100a–d.

As rotor 40 is rotated in the direction of arrow 90, each closely adjacent pair of vanes are urged by centrifugal force against the chamber wall 16. See vanes 70a, 70b and 70g, 70h, for example. As the rotor drives the vane elements through constricted portion 50, the arcuate vane portions 74 are urged into substantially flush interengagement with the outer circumferential surface of the rotor. The enlarged tips 76 of vanes 70a–h are received by associated recesses 100a–d as the vanes pass through the constricted region. For example, as shown in FIG. 1, at the 5 o'clock position, tips 76 of adjacent vanes 70d and 70e which are curved generally toward one another, are received almost simultaneously by an associated recess 100b. This enables the pivoting vanes 70d, 70e to interengage the circumferential surface of rotor 40 in a generally flush manner as the vanes are driven through constricted chamber region 50. As a result, the compartment 92d formed at the most constricted portion of the chamber is compacted significantly. Virtually all of the air in the compartment is compressed into the space between pivot shafts 72 of vanes 70e and 70f. The small space in compartment in 92d provides the air with increased compression so that more efficient compressor operation is exhibited.

Figure 3:
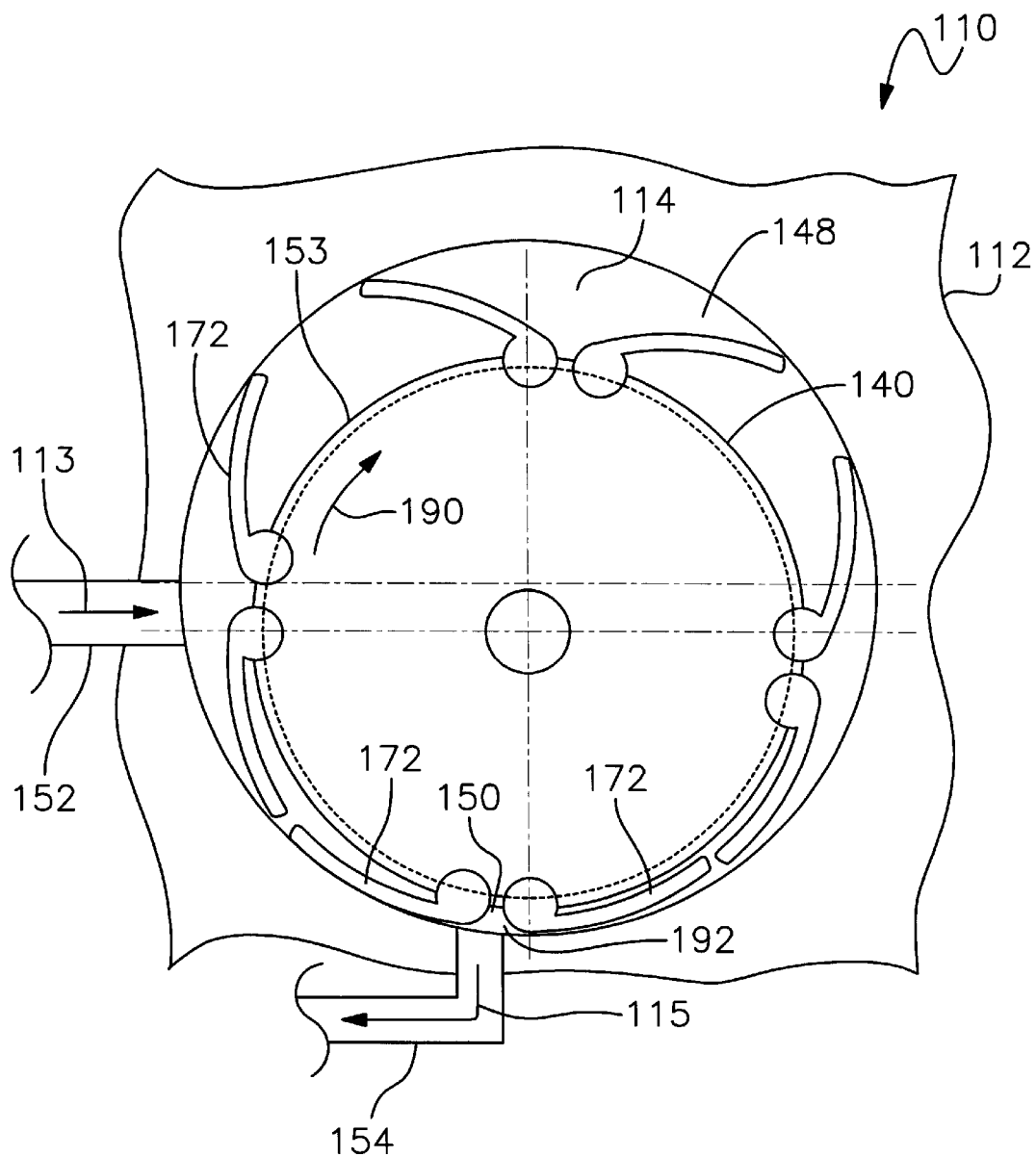
FIG. 3 is an elevational partly schematic view of an alternative preferred embodiment of the invention, which utilizes diverging pairs of curved vanes that flushly engage the circumferential surface of the rotor.

There is shown in FIG. 3 an alternative compressor 110 according to this invention. Once again the compressor comprises a housing 112 having a cylindrical chamber 114. A rotor 140 is eccentrically mounted within chamber 114 in the manner previously described. As a result, the chamber includes a main chamber region 148 and a constricted chamber region 150. An air intake manifold or port 152 is operably connected to main chamber portion 148 and an exhaust manifold of port 154 is operably connected to constricted chamber region 150.

In this version, rotor 140 has a substantially smooth circumferential surface 153 that is devoid of the previously described recesses. Multiple pairs of vanes 172 are pivotably mounted in circumferential surface 153. The proximally adjoining pairs of vanes include curved portions that diverge from one another outwardly from the circumferential surface 153. Conversely, each distally adjoining pair of vanes 172 converges as the vanes extend outwardly from the rotor. In this embodiment, the vanes have a generally uniform thickness, although the outer end or tip of each vane may be somewhat thicker than the inner end or neck proximate the pivoting shaft. A Teflon (™) or Teflon (™) composite material is provided so that the vanes move smoothly with reduced wear.

In this embodiment, the vanes are curved such that they substantially flushly conform with the outer circumferential surface 153 of rotor 152. This is best illustrated by the adjoining vanes 172 traveling through constricted chamber region 150.

In operation, the motor of compressor 110 drives rotor 140 in the direction of arrow 190. Centrifugal force causes vanes 172 to pivot outwardly and engage the peripheral wall of chamber 114. Air is introduced into main chamber region 148 in the direction of arrow 113. Each adjoining pair of vanes 172 defines a compartment that transmits the introduced air through main chamber region 148 to constricted chamber region 150. Within this region, the narrowing space of the chamber forces vanes 172 to flushly interengage circumferential surface 153 of rotor 140. A very small compartment 192 is formed between the adjoining vanes 172 within constricted region 150. This very small space causes the air to be compressed in an increased and highly efficient manner. The air is then transmitted outwardly through exhaust port 154 in the direction of arrow 115. It should be noted that the position of the intake and exhaust ports are depicted schematically in each of the embodiments of this invention. Alternative positionings may be employed within the scope of the invention. It is also very important that both closely and distally adjoining pairs of vanes be curved in opposite directions so that the air transmitting compartments of this invention are defined. This provides significantly improved and highly efficient pumping of air through the system.

Figure 4:
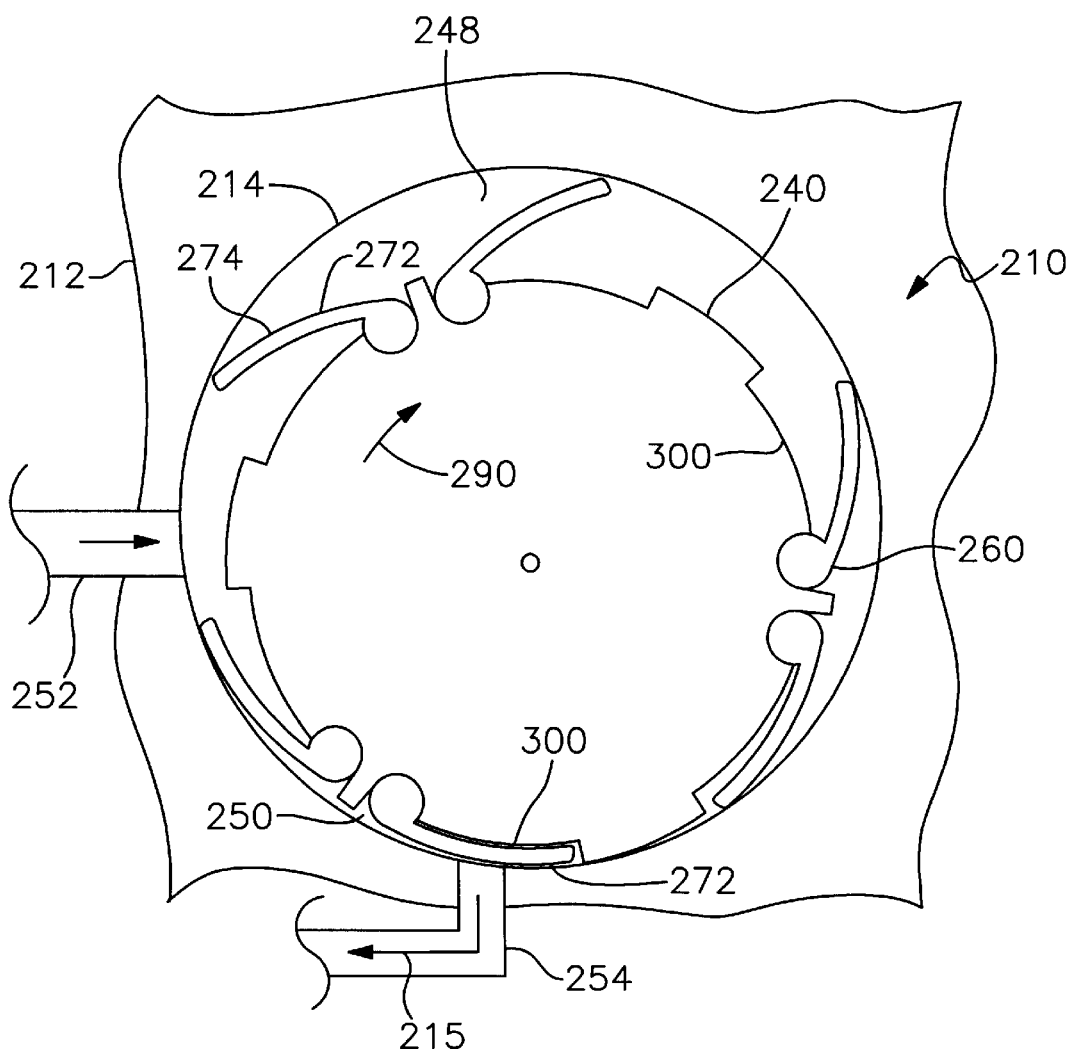
FIG. 4 is an elevational, partly schematic view of still another preferred embodiment, in which each vane is received in a circumferential recess in the rotor.

Still another embodiment of the invention is depicted in FIG. 4. In this version, compressor 210 again features a housing 212 having an internal chamber 214. A rotor 240 is mounted eccentrically within chamber 214 to define a main chamber region 248 and a constricted chamber region 250. Intake and exhaust ports 252 and 254, respectively, are connected with the main chamber and constricted chamber regions.

In this version, rotor 240 includes a plurality of recesses 300 that are spaced about the circumference of the rotor. Recesses 300 are somewhat wider than the recesses 100–100d shown in the first embodiment of this invention. Each recess 300 receives the entire body 274 of a respective pivoting vane 272. Once again, multiple pairs of pivoting vanes 272 are mounted to the circumferential surface of rotor 240. Each vane includes a pivot shaft 260 that is secured within the rotor in the manner previously described and also shown in U.S. Pat. No. 5,188,524. The vanes 272 feature a composition and construction that is analogous to the vanes previously described and also described in the referenced patent. As rotor 240 is driven within chamber 214, in the direction of arrow 290, centrifugal force causes the vanes to pivot outwardly such that they engage the circumferential surface of chamber 214.

Each vane 272 is curved such that it conforms to the circumferential curvature within its associated recess 300 of rotor 240. In other words, when vane 272 is pivoted into its respective recess 300, the vane substantially flushly interengages the surface of the recess and therefore the curved surface of the rotor. This is best depicted by the vane 272 received in recess 300 proximate constricted chamber region 250 and exhaust port 254. In operation, as the rotor is turned in the direction of arrow 290, the diverging pairs of vanes 272 pivot outwardly and interengage the outer wall of chamber 214. Air is introduced into the compressor chamber through intake port 254. Each adjoining pair of vanes 272 defines a compartment that transmits the introduced air through the gradually expanding and then contracting chamber 214. Eventually, each adjoining pair of vanes transmits the air within their associated compartment to constricted chamber region 250. At this point, the vanes are forced into their respective recesses 300 and the compartment space is extremely constricted. Improved and highly efficient compression of the transmitted air is thereby achieved. This air is then exhausted through port 254 in the direction of arrow 215.

In each version of this invention improved compression and pumping are obtained. The vane design disclosed in each of the embodiments may be interchanged in any of the other versions in accordance with this invention. Likewise, the specific rotor designs may be substituted for one another.

It should also be noted that a variety of motor can be used to operate the compressor. For example, the compressor may employ a brushless DC three-phase motor with a very low speed (e.g. less then 1800 RPMs). Because the compressor vanes collect and move a greater volume of air, the speed of the motor can be reduced. This significantly reduces the noise generated by the compressor and also reduces vane breakage and maintenance costs.

Various other types of recesses may be formed in the rotor for receiving the vane elements. These elements may feature alternative types of configurations within the scope of this invention.

Although specific features of the invention are shown in some of the drawings and not others, this is for convenience only, as each feature may be combined with any and all of the other features in accordance with this invention.

Other embodiments will occur to those skilled in the art and are within the following claims:

What is claimed is:

1. A rotary compressor comprising:

a housing having a generally cylindrical chamber;

a rotor mounted eccentrically within said chamber to define about said rotor a main chamber region, which narrows to a constricted chamber region, said rotor having a circumferential surface;

an intake port formed in the housing for introducing air into the main chamber region;

an exhaust port formed in said housing for discharging air from said constricted chamber region;

at least one adjoining pair of curved vanes pivotably attached to said rotor and extending in generally opposite arcuate directions from said rotor into said chamber; and means for rotatably driving said rotor in a single direction such that said adjoining pivot vanes are urged against the walls of said chamber to define a compartment that transmits the air from said main chamber region to said constricted chamber region, whereby said air is compressed and discharged through said exhaust port; said circumferential surface of said rotor and each said vane having substantially conforming curvatures such that each said vane is driven into substantially flush interengagement with said circumferential surface when said vane is driven by said rotor into said constricted chamber region, said rotor including recess means formed in said circumferential surface of said motor for receiving said vanes as said rotor drives said vanes through said constricted chamber such that the size of the compartment is substantially decreased and air compression in the compartment is substantially increased, each vane including an enlarged distal portion and said recess means including a plurality of longitudinal recesses, each receiving said enlarged distal portion of at least one vane when said vane is driven through said constricted region.

2. The device of claim 1 in which each said recess receives said enlarged portions of an associated pair of vanes.

3. The compressor of claim 2 in which said associated pair of vanes includes respective arcuate portions that extend outwardly from said rotor in a generally convergent manner.

4. The compressor of claim 3 in which each vane of said pair includes an enlarged distal portion that is received by said recess means at least when said vane is driven through said constricted region.

5. A rotary compressor comprising:

a housing having a cylindrical chamber;

a rotor mounted eccentrically within said chamber to define about said rotor a main chamber region, which narrows to a constricted chamber region, said rotor having a circumferential surface;

an intake port formed in the housing for introducing air into the main chamber region;

an exhaust port formed in said housing for discharging air from said constricted chamber region;

at least one adjoining pair of curved vanes pivotably attached to said rotor and extending in opposite arcuate directions from said rotor into said chamber; and means for rotatably driving said rotor in a single direction such that said adjoining pivot vanes are urged against the walls of said chamber to define a compartment that transmits the air from said main chamber region to said constricted chamber region, whereby said air is compressed and discharged through said exhaust port, said circumferential surface of said rotor and each said vane having conforming curvatures and said rotor being positioned within said chamber such that each said vane is driven into flush interengagement with said circumferential surface when said vane is driven by said rotor into said constricted chamber region; said rotor including recess means formed in said circumferential surface of said rotor for receiving said vanes as said rotor drives said vanes through said constricted region such that the size of the compartment is substantially decreased and air compression in the compartment is substantially increased, each vane including an enlarged distal portion and said recess means including a plurality of longitudinal recesses, each receiving said enlarged distal portion of at least one vane when said vane is driven through constricted region.

6. The compressor of claim 5 in which each said recess receives said enlarged portion of an associated pair of vanes.

7. The compressor of claim 6 in which said associated pair of vanes includes respective arcuate portions that extend outwardly from said rotor in a generally convergent manner.

8. The compressor of claim 7 in which each vane of said pair includes an enlarged distal portion that is received by said recessed means at least when said vane is driven through said constricted region.

* * * * *